Patented Feb. 15, 1938

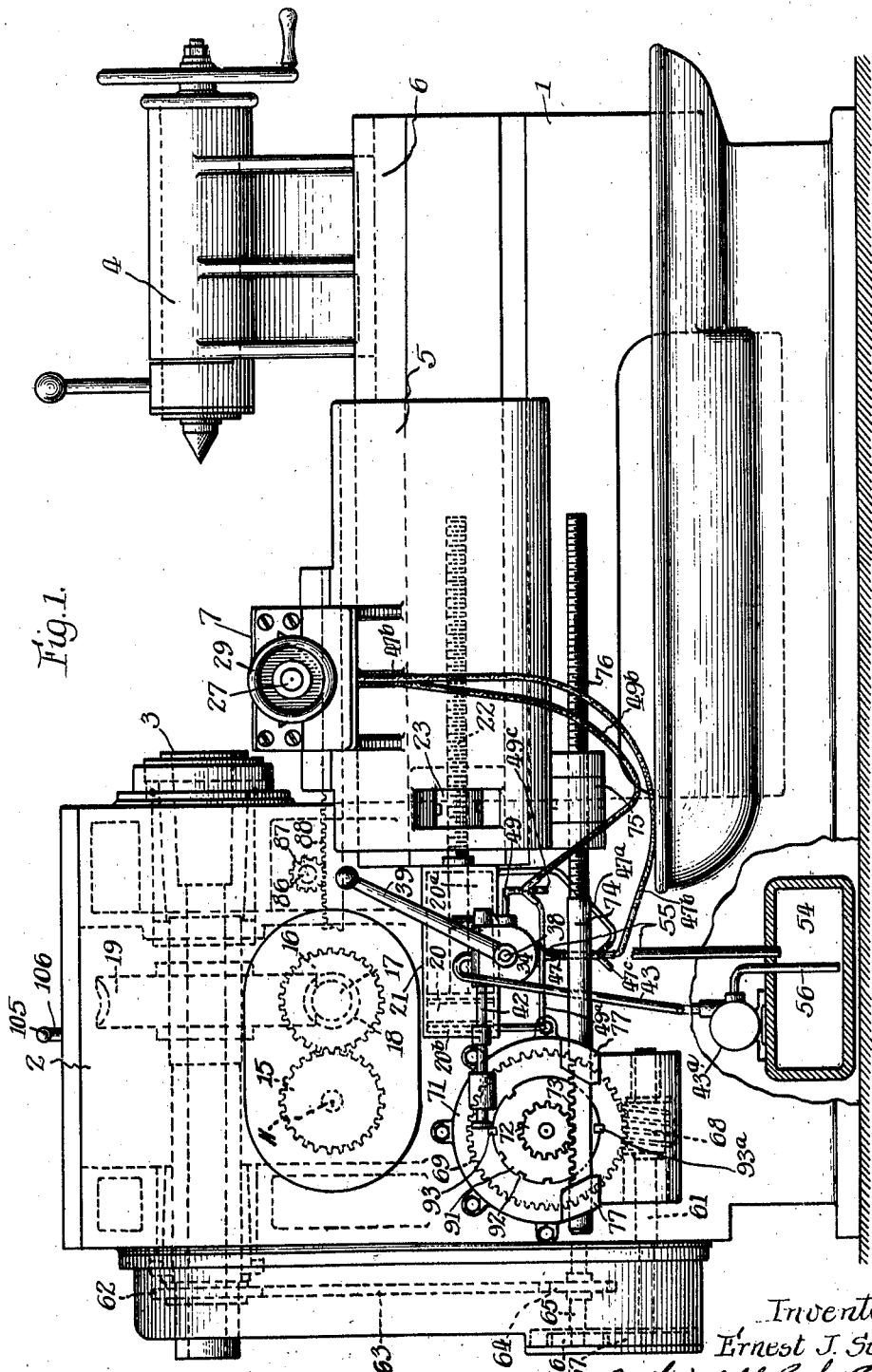

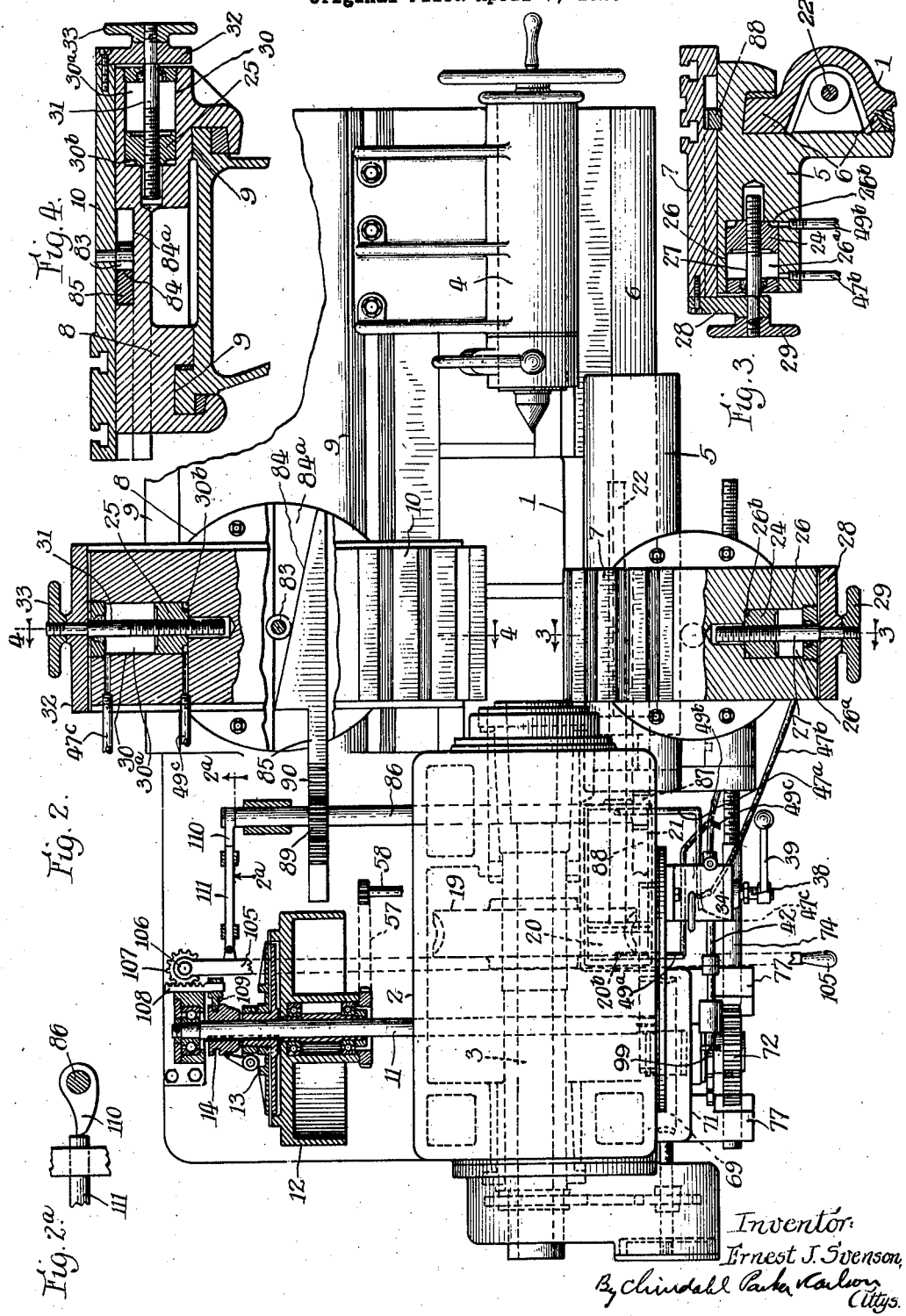

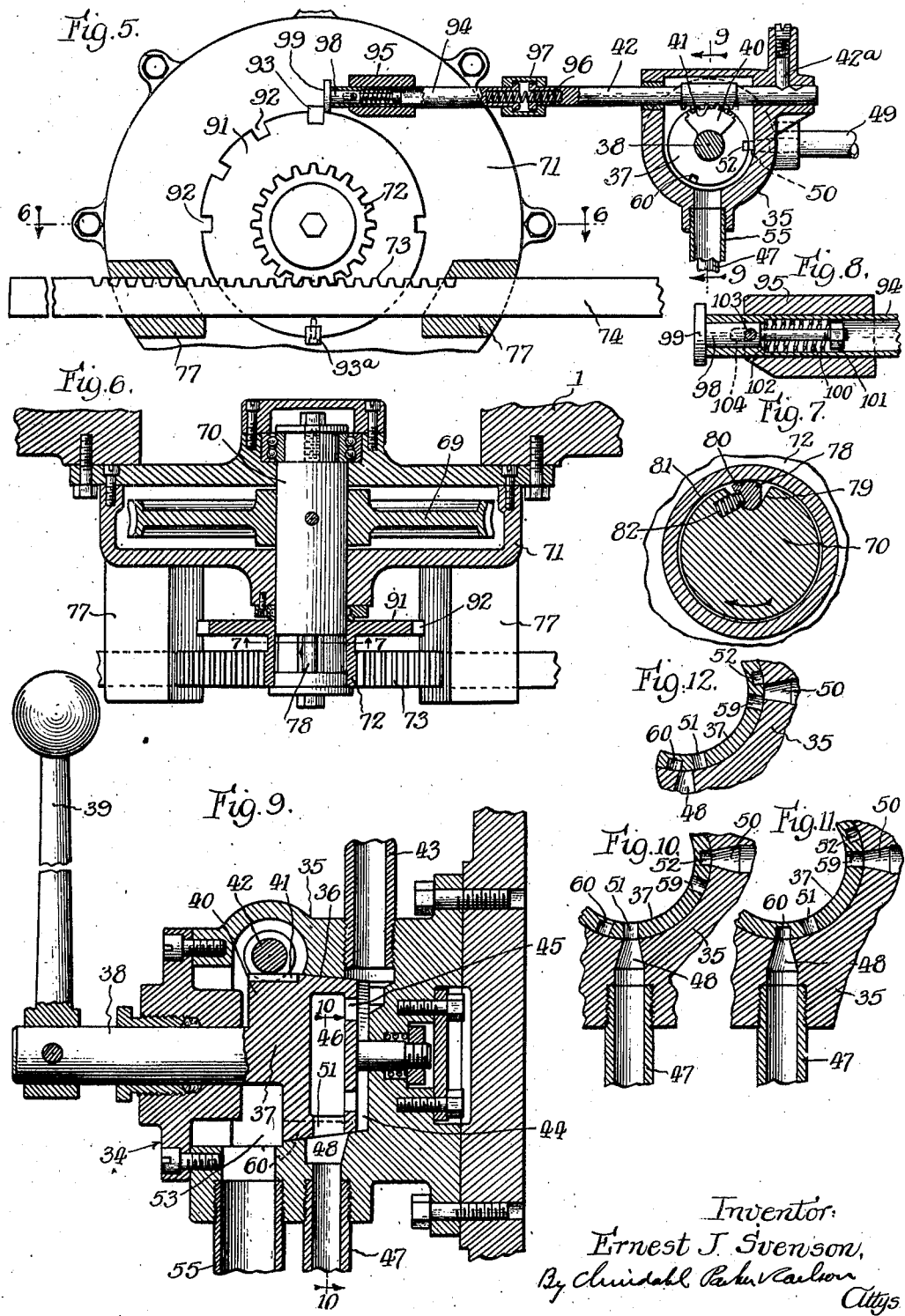

2,108,353

UNITED STATES PATENT OFFICE 2,108,353

FEEDING MECHANISM

Ernest J. Svenson, Rockford, Ill., assignor to Sundstrand Machine Tool Co., Rockford, Ill., a corporation of Illinois Application April 7, 1928, Serial No. 268,159
Renewed July 14, 1937

30 Claims. (Cl. 82—2)

The invention relates generally to feeding mechanisms and more particularly to mechanisms for actuating the tool or work supports of machine tools.

Many efforts have been made heretofore to provide pressure fluid or hydraulically operated mechanisms for actuating the tool or work supports of various types of machine tools but little success has been attained in providing hydraulically operated feeding devices for supports which must move at a uniform or constant speed even though subjected to varying loads. This has been due principally to the fact that movable supports (such for example as the tool carriages and slides in lathes) must, during the feeding movements thereof, be actuated at a practically uniform speed and, in most instances, must be capable of providing a predetermined amount of feed per revolution of the work spindle even though the torque applied to the spindle or the power required to move the tool support may vary considerably during a revolution of the work spindle.

Numerous attempts have been made to control the feeding speed of such tool support by controlling the pressure and volume at which the fluid is supplied to the actuating mechanism but such devices are more or less complicated, expensive, and likely to jar or chatter the tool support during operation.

It is the general object of the invention to provide a machine with pressure fluid operated mechanism of a simple character for effecting the movements of the tool or work supports, together with novel mechanism for controlling the rate of feed of the supports.

Another object is to provide a machine with hydraulically operated mechanism arranged normally to actuate a movable support at a traverse or non-cutting speed, together with mechanical means operable during movement of the support by said mechanism to restrain the movement of the support to a feeding or cutting speed.

Another object is to provide an automatic lathe with mechanically controlled mechanism for feeding and traversing the tool supports together with automatic control for said mechanisms arranged to provide a high rate of production by eliminating the time which is normally lost in the operation of lathes embodying mechanically actuated carriages in operating the mechanical clutches.

Another object is to provide a lathe embodying a complete hydraulic feed and rapid traverse mechanism for a tool support together with mechanism for controlling the feed or cutting movements of the support arranged to produce a uniform feed per revolution of the spindle.

Another object is to provide a lathe with hydraulically operated mechanism for feeding and traversing the tool supports together with mechanical devices driven from the lathe spindle arranged to determine the feeding movements of the supports.

Another object is to provide new and improved mechanism for actuating a tool or work support of a machine arranged to prevent breakage of parts of the machine if the rotating work or tool holder should stop during the operation thereof.

Another object is to provide a hydraulically operated mechanism for actuating the tool supports in a lathe which will eliminate any stuttering or jarring of the supports during the cutting operation.

A further object is to provide a simplified mechanism for actuating and controlling the tool supports in an automatic lathe arranged to eliminate mechanical clutches and the control mechanism generally used to operate such clutches.

In pursuance of the foregoing and other objects the invention in its preferred form is shown embodied in a lathe having a longitudinally movable front carriage with a cross tool slide thereon and a longitudinally adjustable rear carriage with a cross tool slide thereon together with hydraulically operated devices for reciprocating the front carriage and the tool slides and mechanical devices driven from the spindle of the lathe for controlling the feeding or cutting movement of certain of the tool supports.

Other objects and advantages of the invention will become apparent from the following detailed description of the exemplary embodiment of the invention taken in connection with the accompanying drawings thereof in which:

Fig. 1 is a front elevation of a lathe embodying the preferred form of the invention.

Fig. 2 is a plan view thereof, partly in section.

Fig. 2ª is a fragmental view of the main clutch trip device taken along the line 2ª—2ª of Fig. 2, but showing the parts in other positions when the clutch is disengaged.

Fig. 3 is a transverse section through the front carriage and cross slide along the line 3—3 of Fig. 2.

Fig. 4 is a transverse section through the rear carriage and cross slide along the line 4—4 of Fig. 2.

Fig. 5 is a fragmentary elevational view, partly in section, of the control mechanism.

Fig. 6 is a section along the line 6—6 of Fig. 5.

Fig. 7 is a section along the line 7—7 of Fig. 6.

Fig. 8 is an enlarged fragmentary section of a portion of the automatic trip device.

Fig. 9 is a vertical central section through the control valve along the line 9—9 of Fig. 5.

Fig. 10 is a fragmentary sectional view along line 10—10 of Fig. 9, showing the position of the control valve during the approach movement of the tool supports.

Fig. 11 is a view similar to Fig. 10 showing the position of the control valve during the return movement of the tool supports.

Fig. 12 is a sectional view showing the position of the control valve when the tool supports are returning at a reduced speed.

While the invention is susceptible of embodiment in many different forms there is shown in the drawings and will herein be described in detail one such embodiment, with the understanding that the present disclosure of the invention as embodied in a lathe is to be considered as an exemplification of the principles of the invention and is not intended to limit the invention to the embodiment illustrated. As will be readily apparent to those skilled in the art the invention is equally well adapted for use in connection with tool or work supports in other types of machines. The scope of the invention will be pointed out in the appended claims.

In the exemplary form selected for purposes of disclosure, the invention is embodied in a lathe having a base or bed 1, a head stock 2 at one end of the bed, in which headstock a work supporting spindle 3 is rotatably mounted, and a tailstock 4, between which and the spindle 3 work pieces (not shown) may be secured. Preferably a front tool support or carriage 5 is mounted for movement longitudinally of the bed upon supporting ways 6 and is provided with a transversely movable tool slide 7 (see Fig. 3). A rear tool carriage 8 (Fig. 4) is adjustable longitudinally of the bed upon ways 9 and is provided with a transversely movable tool slide 10.

As illustrated herein, a main drive shaft 11 extending transversely of the bed at the headstock end is arranged to be driven from a drive pulley 12 by means of a suitable clutch device 13 which is controlled by a shiftable clutch member 14. The spindle 3 is arranged to be driven from said main drive shaft through gearing that permits of varying the spindle speed. Thus a pair of pickoff gears 15, 16 are mounted respectively on the forward end of the drive shaft 11 and the forward end of an adjacent and parallel shaft 17 which shaft 17 carries a worm 18 meshing with a worm wheel 19 secured to the spindle. As the mechanism for driving the spindle is well known in the art, these various parts are shown somewhat generally in the drawings.

The invention contemplates that the tool supports will be reciprocated by hydraulically operated mechanisms and that to insure an absolutely uniform feeding movement of the supports during the cutting operations, the feeding control movements will be determined by mechanical control devices driven simultaneously with or from the spindle of the lathe. In this way the rapid traverse or rapid approach and rapid return movements of the tool supports are obtained by means of hydraulically operated actuating mechanisms, slight variations in the speed of these movements being practically immaterial, and the feeding or cutting movements which are desired to be absolutely uniform as to speed, or at a predetermined feed per revolution of the spindle are timed mechanically from the spindle. This arrangement permits of a simplified mechanism for reciprocating the tool supports and an extremely convenient control thereof and eliminates the use of mechanical clutches and their attendant actuating devices.

In its preferred form the invention provides piston operated motors for reciprocating the tool supports arranged normally to move the supports at a traverse or non-cutting speed, together with mechanically driven devices arranged to restrain the supports to a constant and much slower feeding or cutting speed during the cutting operations. Thus the front carriage 5 is provided with a piston 20 which is arranged to reciprocate in a cylinder 21 suitably secured to the bed of the lathe, the piston being mounted on one end of a rod 22 which extends through an aperture in one end of the cylinder and is adjustably secured to the carriage by means of a nut 23. This nut engages a screw threaded portion of the piston rod 22 and is secured against longitudinal movement on the carriage. The adjustable connection between the rod 22 and the carriage 5 is provided so as to permit of adjusting the normal positions of the carriage upon the bed.

Similarly pistons 24 and 25 (Fig. 2) are provided for the front and rear cross slides respectively. The piston 24 is arranged to reciprocate in a cylinder bore 26 formed in the carriage 5 and is adjustably connected to the cross slide 7 by means of a rod 27 which has a threaded connection with the piston and is rotatably mounted in a depending portion 28 of the cross slide. A hand wheel 29 is preferably provided on the rod 27 so as to permit of adjustment of the normal position of the cross slide 7 on the carriage. The piston 25 for the rear tool slide is reciprocably mounted in a cylinder bore 30 in the rear carriage 8 and is connected to the rear tool slide 10 by means of a rod 31 which has a threaded connection with the piston and is rotatably mounted in a depending portion 32 of the tool slide. The rod 30 has a hand wheel 33.

Inasmuch as the invention in its preferred form provides for performing a plurality of cutting operations simultaneously upon a work piece, a unitary control mechanism is employed for the tool supports. As illustrated herein the control for the hydraulically operated reciprocating mechanisms comprises a valve 34 (Fig. 9) arranged to control the inlet and exhaust of pressure fluid to and from the opposite sides of the pistons 20, 24 and 25 together with suitable conduit connections between the valve and the respective cylinder bores, and between the valve and a supply of pressure fluid.

The valve 34 in the form disclosed herein comprises a hollow casing 35 having a conically formed bore 36 therein in which a rotary valve member 37 is slidable. This valve member is provided with a stem 38 operable by means of a manual control handle 39, and is rotatably mounted in suitable bearings in the casing 35 for movement between two operating positions corresponding to approach and return movements of the tool supports. The valve member 37 is preferably provided with a segmental portion 40 having peripheral gear teeth 41 which mesh with rack teeth on a control rod 42 which rod is slidably mounted in the casing 35 and extends through one wall thereof (Figs. 5 and 9). This rod as described hereinafter is arranged to be operated automatically.

A conduit connection 43 (Fig. 1) is provided between a suitable pressure pump 43ª and a chamber 44 formed in the casing 35 to the rear of the valve member 37. Ports 45 in the end of the valve member are arranged to establish communication between the chamber 44 and a supply chamber 46 formed in the valve member. A return chamber 53 in the valve casing 35 at the other end of the valve member 37 is in constant communication with and arranged to discharge into a pressure fluid supply reservoir 54 (Fig. 1) through a conduit 55. An intake pipe 56 leads from the reservoir to the pump 43ª, the pump being driven preferably from the drive pulley 12 by means of a chain connection 57 (Fig. 2) between the pump shaft 58 and the pulley.

To supply pressure fluid to and to return it from the cylinders a conduit 47 (Fig. 9) connects with a feed port 48 in the casing 35 and is provided with branches 47ª, 47ᵇ, and 47ᶜ (47ᶜ shown in part in Figs. 1 and 2) connecting with the feed sides 20ª, 26ª and 30ª (Figs. 1 and 2) of the cylinders 20, 26 and 30 respectively, and similarly a conduit 49 (Fig. 5) connects with a return port 50 in the casing 35 and is provided with branches 49ª, 49ᵇ and 49ᶜ (49ᶜ shown in part in Figs. 1 and 2) connecting with the return sides 20ᵇ, 26ᵇ and 30ᵇ of the cylinders 20, 26 and 30. The return port 50 is herein shown displaced 90° from the feed port 48 (Figs. 5, and 10 to 12) and it is contemplated that the valve member 37 will have two fully open operative positions determined by a detent device 42ª (Fig. 5). In the position shown in Fig. 10, a supply port 51 in the valve member establishes communication between the supply chamber 46 and the feed port 48, a longitudinally extending port 52 on the periphery of the valve member being then positioned to connect the return port 50 with the return chamber 53. Thus with the valve in the position shown in Figs. 9 and 10, and the pump 43ª operating, fluid under pressure will be supplied to the cylinders 20, 26 and 30 to advance the corresponding tool supports.

In the other fully open operative position of the valve 37 (Fig. 11) a feed port 59 in the valve member 37 is arranged to establish communication between the supply chamber 46 and the return port 50, a longitudinally extending peripheral port 60 then connecting the feed port 48 with the return reservoir 53. By these connections fluid under pressure is supplied to the return sides 20ᵇ, 26ᵇ and 30ᵇ of the tool support actuating cylinders and fluid is returned from the feed sides 20ª, 26ª and 30ª thereof to the oil reservoir 54 so that the supports are returned towards their initial positions.

The invention contemplates that the fluid supplied by the pump 43ª will be of such volume and pressure as to move the tool supports at "non-cutting" or "rapid traverse" speeds, during which movements the power required to move the supports is constant and slight variations in the speed of the supports due to variations in the pressure of the fluid are of no material consequence. To provide an accurately controlled "feeding" or "cutting" movement of the tool supports, independent of variations in the pressure of the fluid and variations in the loads imposed by the cutting operations, mechanical means is provided for determining the speed of the tool supports during these movements. Such mechanical means is, generally speaking, in the form of a positively driven abutment against which the tool support or a part connected thereto is arranged to engage, the force exerted by the hydraulic piston being sufficiently great to maintain constant contact between the said support or connecting parts and the abutment during the feeding movement of the support. The mechanism provided thus to determine the speed of the feeding movement of the front carriage 5 will now be described.

This mechanism in the preferred form illustrated herein, embodies an abutment driven from the spindle 3 and comprises a longitudinally extending shaft 61 (Fig. 1) suitably journalled on the bed of the lathe which shaft is driven from a sprocket 62 on the rear end of the spindle by means of a chain 63, a sprocket 64 on a short shaft 65, and intermeshing pickoff gears 66, 67 on the shafts 65, 61 respectively. Thus the pickoff gears 66, 67 permit of varying the speed of the shaft 61 relatively to that of the spindle 3. A worm 68 on the shaft 61 meshes with a worm wheel 69 (Figs. 1, 2 and 6) which is pinned on a feed control shaft 70 extending transversely of the bed and journalled on a casing 71 secured thereto.

In the present instance the shaft 70 as hereinafter more fully described may be considered as the abutment member, and connection is provided between the carriage 5 and the shaft 70 so that during the feeding movement of the carriage, the carriage is restrained from moving at a rate faster than that determined by the shaft. In the exemplary form of the invention this connection includes a pawl and ratchet like mechanism arranged so as to limit the forward or feeding movement of the carriage and to permit the carriage 5 to be returned at a faster or rapid traverse speed independent of the shaft 70.

As illustrated in the drawings a pinion 72 (Figs. 1, 2, 5 and 6) is rotatably mounted on the shaft 70 adjacent its forward end. This pinion meshes with teeth 73 on a rack bar 74 which extends longitudinally of the bed and is secured to the carriage 5 by means of a rotatably mounted nut 75 on the carriage engaging a threaded portion 76 of the bar. The bar 74 is preferably supported adjacent the pinion 72 for sliding movement longitudinally of the bed by means of guide posts 77 secured to the casing 71.

To determine the feeding speed of the carriage 5 during a forward movement thereof, in which movement the carriage is actuated by the pressure fluid mechanism disclosed hereinbefore, means is provided to prevent the pinion 72 from rotating faster than the shaft 70. As illustrated herein this means comprises a pawl 78 (Figs. 6 and 7) pivotally mounted in a groove 79 in the shaft 70 and having a cam surface 80 which is urged into engagement with the wall of the bore 81 of the pinion 72 by means of a coil spring 82. Thus during the feeding movement of the carriage 5 the pawl 78 is wedged into engagement with the pinion 72 and thereby connects the pinion rigidly with the shaft so as to prevent the pressure fluid mechanism from moving the carriage faster than the speed determined by the mechanical drive to the shaft 70 whereas during a return movement of the carriage the pawl 78 slips freely around the bore 81 of the pinion and the pressure fluid mechanism is permitted to return the carriage at a rapid traverse speed.

The invention contemplates that the "feeding" or "cutting" movements of the cross slides may also be maintained absolutely constant by means of a mechanical control mechanism. For purposes of disclosure it has been thought sufficient to illustrate but one of the tool slides so controlled and mechanism for controlling the rear tool slide 10 is therefore shown in the drawings. This mechanism comprises a roller 83 (Figs. 2 and 4) mounted on and depending from the tool slide and arranged to engage a cam surface 84 on a cam bar 85 which is slidably mounted in a groove 84ª in the carriage 8 for movement longitudinally of the lathe. This cam bar is preferably actuated in timed relation with the front carriage 5 in a manner such that during the forward movement of the carriage 5, the cam bar will be moved towards the left (Fig. 2). Thus the cam surface 84 serves as a receding abutment for the roller 83 and thereby determines the feed speed of the tool slide 10 towards the work when actuated by means of the pressure fluid operated feeding mechanism. The means for actuating the cam bar 85 is herein shown as comprising a shaft 86 (Figs. 1 and 2) extending transversely of the lathe and into the headstock 2 thereof, said shaft being connected to the carriage 5 by means of a pinion 87 on the forward end of the shaft meshing with a rack bar 88 supported on and movable by the carriage, and a pinion 89 on the shaft meshing with teeth 90 on the cam bar 85.

In its preferred form the invention provides an automatic control for the tool support movements and for stopping the lathe upon the completion of the operations on each work piece. This control includes mechanism for actuating the valve member 37 so as to advance and return the tool supports and also mechanism for disengaging the main clutch 13 to stop the spindle. It will be noted that the pump 43ª is preferably driven directly from the main drive pulley 12 so that the tool supports may be actuated by means of the pressure fluid operated mechanism when the spindle is at rest.

The automatic control mechanism in its exemplary form (Figs. 1, 2, 5 and 6) comprises a dog-carrying disc 91 formed integrally with the pinion 72 so as to be rotated during movement of the carriage 5 by means of the rack bar 74. This disc is preferably provided with a plurality of peripheral notches 92 arranged to receive trip dogs 93, 93ª. A trip rod 94 is positioned in axial alinement with the valve control rod 42 and is slidably mounted in a guide 95 secured to the casing 71. The adjacent ends of the rods, 42, 94 have an expansive coil spring 96 positioned therebetween but are limited in their movement away from each other by means of a slidable connecting sleeve 97. The other end of the rod 94 is tubular in form and arranged to receive a plunger 98 (Fig. 8) which plunger has a head 99 arranged to abut the end of the rod, a spring 100 being interposed between a nut 101 on the inner end of the plunger and a shoulder 102 formed internally on the tubular portion of the rod 94 normally to hold the head of the plunger against the end of the rod. To limit the movement of the plunger outwardly of the control rod 94 a pin 103 is secured to the plunger and arranged to slide in a transverse slot 104 in the rod.

The main clutch 13 is arranged to be controlled manually by means of a lever 105 (Figs. 1 and 2) which preferably extends to the front of the machine and is secured at its rear end to a vertically extending shaft 106. This shaft has a pinion 107 thereon which meshes with a rack bar 108 carrying a yoke 109 arranged to actuate the clutch member 14. Thus the lever 105 is moved to the right to engage the clutch.

The clutch may be disengaged manually by moving the lever in the opposite direction and is arranged to be disengaged automatically by means of a trip finger 110 (Fig. 2ª) secured to the rear end of the shaft 86; a trip rod 111 secured to the lever 105 and suitably mounted for movement longitudinally of the bed being positioned to be engaged by the trip finger 110 (Figs. 2 and 2ª).

Assuming for purposes of illustration, that the tool supports are in their initial or withdrawn positions and that the desired cycle of operation comprises (1) moving the front cross slide in to place the tools thereon in cutting position, (2) moving the front carriage longitudinally towards the headstock at a "feed" rate for a cutting operation, (3) moving the rear cross slide rapidly forward to the work and then continuing its forward movement at a "feed" speed, the valve control handle 39 is moved to place the valve member 37 in the position shown in Fig. 10 whereupon pressure fluid is supplied to the "feed" sides of the cylinders 20, 26 and 30 to advance the tool supports. The front cross slide 7 is thereupon advanced at a traverse rate until the tools thereon (not shown) are properly positioned for a cutting operation as determined by the abutment of the piston 24 against the inner end of the cylinder bore 26. The rear cross slide is also advanced at a traverse speed until the roller 83 engages the cam surface 84. Movement of the front carriage 5 however is prevented by engagement of the pawl 78 with the bore surface 81 of the pinion 72, the shaft 70 not having been placed in motion. Thus the tools (not shown) on the front and rear cross slides are in position to commence their cutting operation.

Engagement of the main clutch 13 by means of the lever 105 connects the drive pulley 12 to the shaft 11 and thereby drives the work spindle 3 and the feed control mechanism including the shaft 70 whereupon the front carriage will be permitted to feed towards the headstock and the rear tool slide will be permitted to feed in towards the spindle as determined by the cam surface 84. Generally the valve control handle 39 and the main clutch lever 105 are moved simultaneously to place the valve in its approach position and to engage the main clutch, the traverse movements of the tools being so rapid as to be completed before the "feed" control members move any appreciable distance. The worm and worm wheel 68, 69 act as a non-reverse-power device so as to prevent power from being transmitted from the hydraulic actuating mechanism for the front carriage back to the spindle.

The end of the forward movements of the tools is determined by the automatic trip mechanism when the reverse dog 93 (Fig. 5) on the trip disc 91 has engaged the head 99 on the trip plunger 98 and moved the trip rod 94 into engagement with the control rod 42. As the trip rod 94 moves to the right (Fig. 5) and abuts the end of the control rod 42, further movement of the trip rod moves the control rod and valve towards its return position, the spring 96 being interposed between the ends of the rods to give a quick movement to the control rod 42 and valve member after the control rod is past the high spot of the detent device 42ª. Preferably the trip finger 110 for the main clutch is arranged to disengage the main clutch simultaneously with the throw over of the valve so as to stop the spindle and feed control mechanism, the pawl 78 then slipping freely within the pinion 72 and the rear tool slide roller 83 then receding from and being unrestrained by the cam 84. The valve member 37 is thereby shifted to the position shown in Fig. 11 whereupon all of the tool supports are returned at traverse speeds toward their initial positions by means of the pressure fluid operated mechanisms.

As shown in the drawings, the return movements of the tool supports continue until the pistons 20, 24 and 25 reach the ends of the respective cylinders. A stop dog 93ª (Fig. 5) on the control disc 91 is preferably positioned so as to engage the head 99 in such time relation that when the front carriage piston 20 abuts the end of the cylinder 21 the valve member 37 has been moved into the position shown in Fig. 12 wherein the flow of pressure fluid to the pistons is practically shut off. The valve stays in this position during the removal of the finished work piece and the insertion of a new piece. The control valve 34 and main clutch 13 are then operated manually to start a new cycle of operations.

It is believed apparent from the foregoing that the invention provides a novel and simplified pressure fluid operated mechanism for actuating the tool supports of a lathe together with devices arranged accurately to control the "feed" or "cutting" movements of the tool supports at uniform speeds. The mechanical control of said "feed" or "cutting" movements retains all of the advantages secured in lathes embodying mechanically driven tool supports so far as uniformity of movements is concerned and obtains the advantages of pressure fluid operated machines in the elimination of clutches and clutch controls and their attendant disadvantages. The invention obviates the disadvantages encountered in former pressure fluid operated machines wherein it was found practically impossible to obtain uniform feeding movements of the tools under varying cutting loads. Thus the invention combines the advantageous features of both the mechanical and hydraulically operated feeding mechanisms and eliminates the disadvantages of both.

It is also evident that the principle of operation disclosed permits of using a simple, inexpensive, efficient and uniform pressure pump in the pressure fluid supply and a simple distribution circuit and enables practical operation without the need of any complicated pressure control devices. The feed control is also of a very simple construction and permits of convenient adjustment by means of the pickoff gears.

There is practically no time lost in reversing the tool supports compared with the time required for reversing in clutch operated devices. Furthermore, if the spindle stops for any reason whatsoever during the cutting operation, the feed of the tools is stopped immediately and all possibility of jamming the tools or breaking parts of the feeding mechanism is eliminated.

I claim as my invention:

1. In a lathe, a bed having carriage ways, means for rotating a work piece, a tool carriage movable longitudinally on said ways and carrying a piston arranged normally to reciprocate the carriage at traverse speeds, a cross slide slidably mounted upon said carriage and piston actuated to reciprocate thereon, a unitary control device for said carriage and cross slide pistons, and mechanical means for restraining the movement of the carriage to a feeding speed when moving in one direction under the action of said piston.

2. A lathe having, in combination, a longitudinally movable carriage, a transversely movable cross slide, a rotatably mounted spindle, means for driving the spindle including a main clutch, actuating mechanism for the carriage including a piston, actuating mechanism for the cross slide including a piston and a cam driven from said carriage, means for actuating said pistons, and a control device actuated by the cross slide mechanism for disengaging the main clutch.

3. A lathe having, in combination, a front tool carriage, a rear tool cross slide, a spindle for rotatably mounting the work, a main clutch for the spindle, actuating mechanism for the carriage and cross slide including reciprocatory pistons, means timed with the rear cross slide for disengaging the main clutch, and means operable with the front carriage arranged to determine the speed of the feeding movement of the rear cross slide.

4. A lathe having, in combination, a front tool carriage, a rear tool cross slide, a spindle for rotatably mounting the work, a main clutch for the spindle, actuating mechanism for the carriage and cross slide including reciprocatory pistons, means to control the movements of said tool supports including a valve arranged in one position to cause an advance of the tool supports, means timed with the rear cross slide for disengaging the main clutch, and means moving with the front carriage arranged to actuate said valve to return the tool supports.

5. A lathe having, in combination, a spindle for rotatably supporting the work, a tool supporting carriage, hydraulically operated means for reciprocating the carriage, control means for the feeding movement of the carriage comprising a shaft driven from the spindle, a rack bar adjustably supported on the carriage, a pinion rotatably mounted on said shaft meshing with said bar and a pawl and ratchet device connecting said shaft and pinion, a valve for controlling said hydraulically operated means, and a control disc for said valve mounted on said pinion.

6. A lathe having, in combination, a spindle for rotatably supporting the work, a tool supporting carriage, hydraulically operated means for reciprocating the carriage and control means for the feeding movement of the carriage comprising a shaft driven from the spindle, a rack bar adjustably supported on the carriage, a pinion rotatably mounted on said shaft meshing with said bar and a pawl and ratchet device connecting said shaft and pinion.

7. A lathe having, in combination, a spindle for rotatably supporting the work, a tool supporting carriage, hydraulically operated means for reciprocating the carriage, and speed control means for the feeding movement of the carriage comprising a shaft driven from the spindle, a member movable with the carriage and a pawl and ratchet device connecting said member and shaft.

8. A lathe having, in combination, a tool carriage, a cross slide, a spindle for rotatably mounting the work, hydraulically operated actuating mechanism for said carriage and cross slide, and means actuated by the carriage arranged to determine the speed of the feeding movement imparted to said cross slide by said actuating mechanism.

9. A machine tool having in combination, a carriage, hydraulic means for reciprocating the carriage, said means including a pump, a receding abutment for the carriage when the latter is moving in a certain direction to limit the movement imparted to the carriage by said hydraulic means to a cutting speed, and a single means for driving the pump and moving the abutment.

10. A machine tool having in combination, a carriage and a spindle, one of which supports the work and the other of which supports the tool, hydraulic means for reciprocating the carriage, said means including a pump, means for driving the pump and rotating the spindle, a clutch between the last-mentioned means and the spindle, and a receding abutment for the carriage when the latter is moving in a certain direction to limit the speed of the carriage when moved by said hydraulic means in said direction, said abutment being driven with the spindle.

11. A lathe having, in combination, a spindle for rotatably mounting the work, a longitudinally movable carriage, a transversely movable tool support supported on said carriage, hydraulically operated actuating means for traversing said carriage and tool support including piston and cylinder devices and means operable in timed relation with said spindle arranged to oppose the movement imparted to said carriage by said actuating means to control the feeding speed thereof in one direction, said tool support moving at a traverse rate in forward and reverse directions.

12. A lathe, comprising, in combination, a rotatable work supporting spindle, a longitudinally movable carriage, a transversely movable tool support, pressure fluid operated means for actuating said carriage and said support at rapid traverse speed, means operatively associated with and moving in timed relation to said spindle for restraining the speed of the movement imparted by said pressure fluid operated means to said carriage in accordance with the rotative speed of said spindle, and means actuated by said carriage effective to restrain the speed of said tool support to a feed rate during a portion of its advance stroke.

13. A machine tool having, in combination, a bed, a rotatably mounted spindle, a slidably mounted support, means for starting and stopping the spindle, actuating mechanism for the support comprising a piston and cylinder device, means to control the movements of said support including a control device arranged in one position to cause an advance movement of the support, means timed with the support for stopping the spindle, and means for moving said control device to return the support.

14. A lathe having, in combination, a bed, a rotatably mounted work support, a slidably mounted tool support, means for driving said work support, actuating mechanism for the tool support including a piston and cylinder device, means for supplying pressure fluid to said cylinder for reciprocating said support at a traverse rate, and means for restraining the movement of said support to a feed rate during a portion of its cycle comprising a cam, means for moving the cam, and means connected to said tool support adapted to engage said cam at the end of the rapid approach movement of the support.

15. A lathe having, in combination, a first tool support, a second tool support, a spindle for rotatably mounting the work, means for driving and starting and stopping the spindle, hydraulic actuating mechanism for the tool supports including reciprocatory pistons, and means timed with one of the tool supports for stopping the spindle.

16. A lathe having, in combination, a reciprocatory tool support, hydraulically operated means for reciprocating said support including a valve, a rack moving with said support, a pinion meshing with said rack, and means connected to and actuated by said pinion operable after a predetermined rotation of said pinion to shift said valve and reverse the direction of movement of said support.

17. A lathe having, in combination, a bed, a carriage movable longitudinally thereon, a cylinder mounted on said bed, a piston in said cylinder, a rod connected at one end to said piston and at the other end to said carriage, a headstock spindle, means for driving said spindle, means for supplying fluid to said cylinder to move the carriage toward the spindle including means driven from the spindle for metering said fluid flowing into the cylinder in one direction, a rear tool cross slide, means for actuating said cross slide comprising a piston and cylinder device, and means driven from said spindle for metering the flow of fluid into said cylinder to move the slide toward the spindle axis during the cutting portion of such movement, and means actuated by the cross slide mechanism for stopping the spindle.

18. A lathe having, in combination, a longitudinally movable front tool carriage, a transversely movable rear tool cross slide, a spindle for rotatably mounting the work, means for driving said spindle, actuating mechanism for the carriage and cross slide including piston and cylinder devices having the pistons movable with said parts, and means timed with the rear tool cross slide for stopping the spindle.

19. A lathe having, in combination, a rotatably mounted work spindle, a longitudinally movable front carriage, a cross slide on said carriage, a rear tool support, piston and cylinder devices for actuating said carriage, cross slide and tool support, means for supplying fluid to said devices for reciprocating the carriage, slide, and support at traverse rates, power driven means for restraining the movement of the carriage to a feed rate during movement in one direction, and a cam device actuated by the front carriage and operative to restrain the movement of the rear tool support to a feed rate during a portion of its advance movement.

20. A lathe having, in combination, a rotatably mounted work spindle, a longitudinally movable carriage, a transversely movable tool support on said carriage, piston and cylinder devices for actuating said carriage and support, means for supplying fluid to said cylinders for reciprocating the carriage and support at traverse rates including valve mechanism arranged in one position to advance the carriage and support, and in another position to return the carriage and support, and power driven means for restraining the carriage to a feed speed during movement thereof in one direction, said support being unrestrained in its movement so as to advance rapidly to a cutting position whereupon it is held in said position during the longitudinal feed movement of the carriage.

21. A lathe having, in combination, a rotatably mounted work spindle, a longitudinally movable support, a transversely movable tool carrier on said support, piston and cylinder devices for actuating said support and carrier, means for supplying fluid to said cylinders for reciprocating said support and carrier including valve mechanism arranged in one position to advance the support and carrier simultaneously, and in another position to return the support and carrier, power driven means for limiting the input of fluid to the support cylinder during movement of the support in the advancing direction, said carrier moving at a traverse rate so as to advance rapidly to a cutting position, the carrier being held in said position by the fluid during the longitudinal feeding movement of the support.

22. A machine tool of the class described having in combination, a pair of tool slides movable toward and away from the work, equalizing connections between said tool slides, fluid pressure cylinders and pistons therein, independently adjustable connections between said pistons and said tool slides, a pump, fluid pressure conducting connections between the pump and cylinders, a control valve in said connections, and means, operable by movement of one of said tool slides, for operating the control valve.

23. A machine tool of the class described having in combination, a pair of tool slides, each movable toward and away from the work and disposed on opposite sides of the work, a pair of fluid pressure cylinders and pistons therein, adjustable connections between said pistons and said tool slides, an equalizing connection between said pistons whereby each piston partakes of the same degree of movement as the other, and valve means, operable by movement of said tool slides, for controlling the movement of said pistons in said cylinders.

24. A machine tool comprising, in combination, a bed, a rotatably mounted spindle, means for driving the spindle, a carriage movable on the bed relative to the spindle, piston and cylinder means for reciprocating said carriage, means for coordinating the movement of said carriage in one direction with the rotation of said spindle comprising two independently driven cooperating rotary parts, one of said parts being rotated in timed relation to said spindle and the other of said parts having a pinion and a rack bar engaged thereby and connected to said carriage to be rotated in timed relation to the reciprocation of said carriage, a control valve for said piston and cylinder means, and a member carried by the part driven by said carriage for actuating said valve.

25. A machine tool comprising, in combination, a bed, a rotatably mounted spindle, means for driving the spindle, a carriage movable on the bed relative to said spindle, piston and cylinder means for reciprocating said carriage, a control valve for said piston and cylinder means, a first rotary element driven from the spindle in timed relation thereto forming part of a means coordinating the reciprocation of said carriage with the rotation of said spindle, a second rotary element concentric with said first element, a pinion on said second element, a rack secured to said carriage and meshing with said pinion to rotate said second element in timed relation to the movement of said carriage, and a member carried by said second element for actuating said control valve.

26. In a lathe, a bed having carriage ways, means for rotating a work piece, a tool carriage movable longitudinally on said ways, a hydraulic motor having one element attached to said carriage and arranged normally to reciprocate the carriage at traverse speeds, a cross slide slidably mounted upon said carriage, a hydraulic motor for actuating said cross slide, a unitary control device for said carriage and cross slide motors, and mechanical means for restraining the movement of the carriage to a feeding speed when moving in one direction under the action of its hydraulic motor.

27. A lathe having, in combination, a front tool carriage, a rear tool cross slide, a spindle for rotatably mounting the work, means for stopping and starting the spindle, actuating mechanism for the carriage and cross slide including reciprocating pistons, means timed with the rear cross slide for stopping the spindle, and means operable with the front carriage arranged to determine the speed of the feeding movement of the rear cross slide.

28. A lathe having, in combination, a first tool support, a second tool support, a spindle for rotatably mounting the work, means for driving and stopping and starting the spindle, actuating mechanism for the supports including reciprocatory pistons, means to control said tool supports including a valve arranged in one position to cause the advance of the tool supports, means timed with one of the supports for arresting rotation of the spindle in its direction of rotation during advance of the supports, and means moving with one of the supports arranged to actuate said valve to return the tool supports.

29. A machine tool having, in combination, a carriage and a spindle, one of which supports the work and the other of which supports the tool, hydraulic means for reciprocating the carriage, said means including a pump, means for driving the pump and rotating the spindle, and a receding abutment for the carriage when the latter is moving in a certain direction to limit the speed of the carriage when moved by said hydraulic means in said direction, said abutment being driven with the spindle.

30. A lathe having, in combination, a first tool support, a second tool support, a spindle for rotatably mounting the work, means for driving and starting and stopping the spindle, hydraulic actuating mechanism for the tool supports including reciprocatory pistons, and means timed with one of the tool supports for arresting rotation of the spindle in the direction in which it was rotating during the advance movement of the supports.

ERNEST J. SVENSON.